(12) United States Patent
Casillas et al.

(10) Patent No.: US 6,493,509 B1
(45) Date of Patent: Dec. 10, 2002

(54) CAMERA WITH SELF-TIMER FOR DELAYED ACTION SHUTTER RELEASE

(75) Inventors: Cristobal Casillas, Guadalajara (MX); Gilberto F. Rodriguez, Guadalajara (MX)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/867,876

(22) Filed: May 30, 2001

(51) Int. Cl.[7] .......................... G03B 17/02; G03B 17/38
(52) U.S. Cl. .......................... 396/6; 396/264; 396/502; 396/535; 396/543
(58) Field of Search .................. 396/264, 263, 396/502, 503, 543, 535, 452, 472, 6, 59, 544

(56) References Cited

U.S. PATENT DOCUMENTS

| | | | |
|---|---|---|---|
| 236,916 A | 1/1881 | Suder | 396/502 |
| 1,263,018 A | 4/1918 | Barbee | 396/503 |
| 2,981,168 A | 4/1961 | Biedermann et al. | 396/455 |
| 3,185,062 A | * 5/1965 | Aurandt | 396/472 |
| 3,665,833 A | * 5/1972 | Müller | 396/463 |
| 3,804,204 A | * 4/1974 | Shono | 185/39 |
| 3,950,773 A | 4/1976 | Winkler et al. | 396/502 |
| 4,293,210 A | 10/1981 | Kando et al. | 396/263 |
| 4,329,039 A | 5/1982 | Kaneko | 396/502 |
| 5,946,514 A | 8/1999 | Balling | 396/472 |

* cited by examiner

*Primary Examiner*—David M. Gray
*Assistant Examiner*—Rochelle Blackman
(74) *Attorney, Agent, or Firm*—Roger A. Fields

(57) ABSTRACT

A camera has a shutter release button that is depressible to initiate picture-taking, and a self-timer for automatically initiating picture-taking after a predetermined interval of time has elapsed. The self-timer is a flexible resilient diaphragm or thin disk to be manually deformable from a normal state to a deformed state and to have the capability of automatically returning to the normal state from the deformed state after the predetermined interval of time has elapsed. A support in the vicinity of the shutter release button is constructed to receive the self-timer in the deformed state in order to position the self-timer raised from the shutter release button, but to permit the self-timer to automatically return to the normal state after the predetermined interval of time has elapsed in order to depress the shutter release button to initiate picture taking. The self-timer can be removed from the support in order to use the shutter release button without the self-timer or to reuse the self-timer.

10 Claims, 4 Drawing Sheets

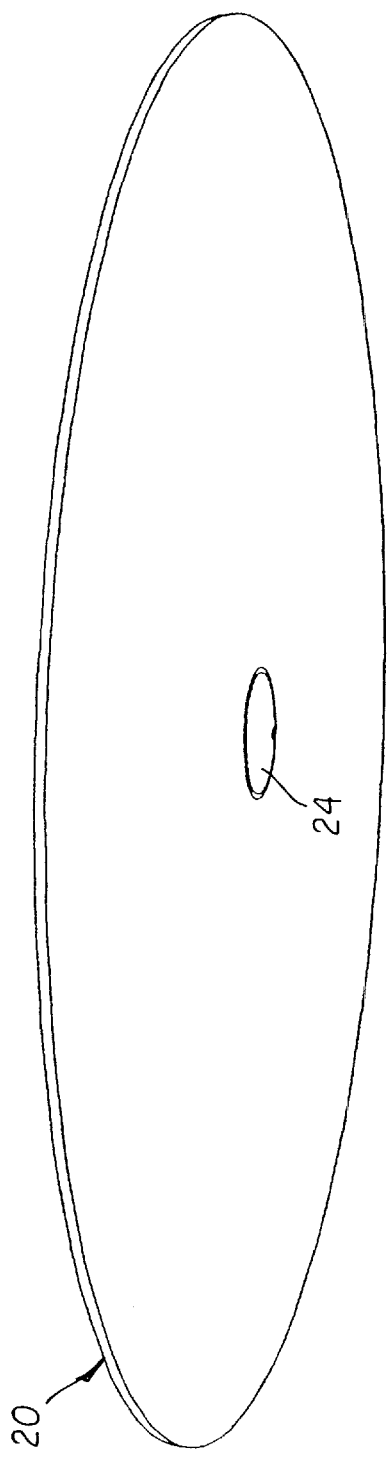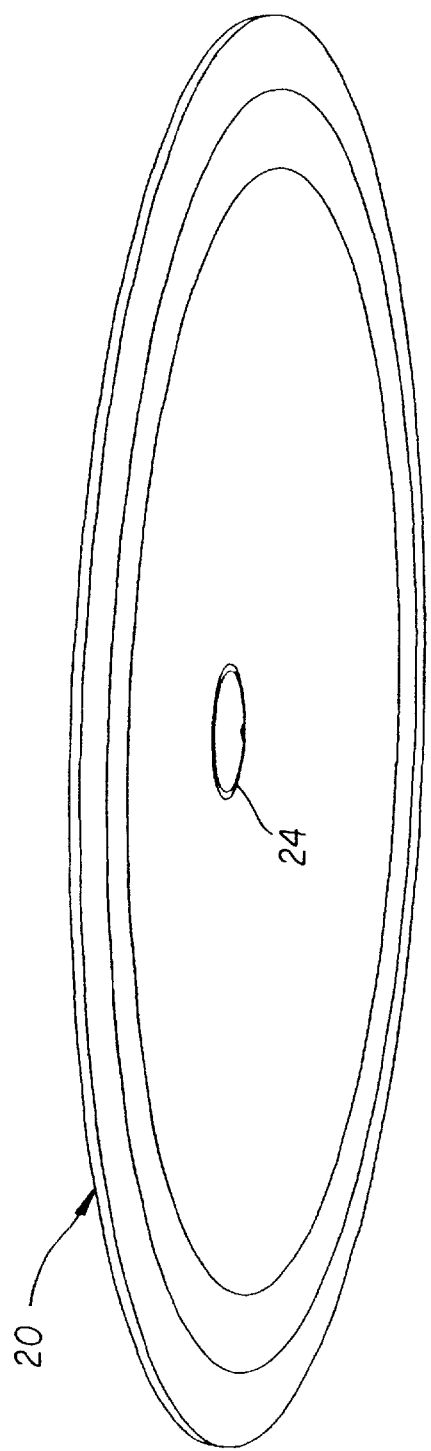

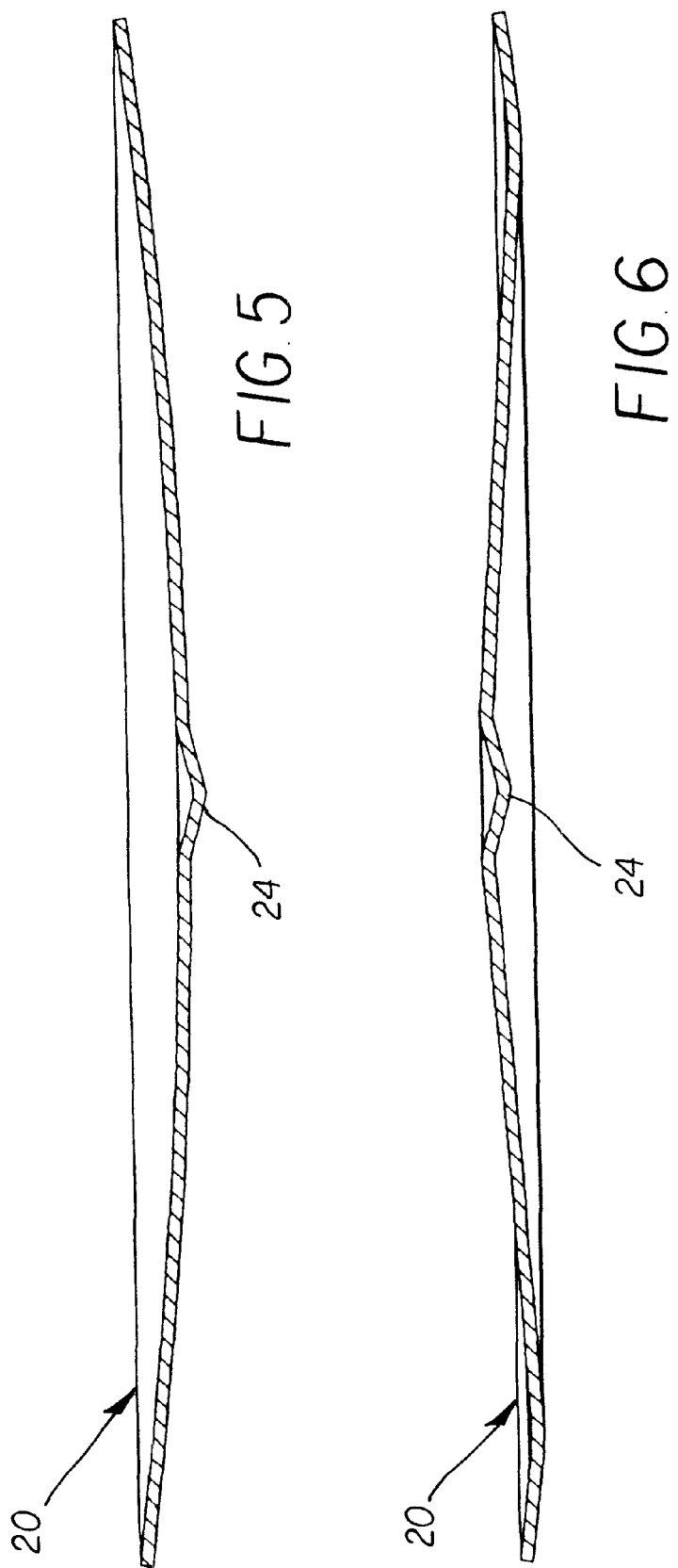

CAMERA WITH SELF-TIMER FOR DELAYED ACTION SHUTTER RELEASE

CROSS-REFERENCE TO RELATED APPLICATION

Reference is made to commonly assigned, co-pending application Ser. No. 09/867,838, entitled CAMERA WITH SELF-TIMER FOR DELAYED ACTION SHUTTER RELEASE, and filed May 30, 2001 in the name of Anthony DiRisio.

FIELD OF THE INVENTION

The invention relates generally to photography, and more particularly to a camera with a self-timer that is otherwise referred to as a delayed action shutter release or delayed action device.

BACKGROUND OF THE INVENTION

Film and cameras that are all in one, commonly referred to as disposable single-use or one-time-use cameras, have become well known. The one-time-use camera is a simple point-and-shoot type camera comprising a conventional film cartridge within a cartridge receiving chamber in a main body part, an unexposed film roll prewound from the film cartridge onto a film supply spool within a film supply chamber in the main body part, a film-exposing backframe opening between the cartridge receiving and film supply chambers in the main body part, a fixed-focus taking lens, a film metering mechanism with a rotatably supported metering sprocket that has respective sprocket teeth for engaging the filmstrip at successive film perforations, a manually rotatable film winding thumbwheel coaxially engaged with a film winding spool inside the film cartridge, a single-blade shutter, a manually depressible shutter release button, an exposure counter wheel that has a numerical series of evenly spaced exposure count indicia and is incrementally rotated to successively view the exposure count indicia, an anti-backup pawl that engages the exposure counter wheel to prevent its reverse rotation, a direct see-through viewfinder having front and rear viewfinder lenses, and in some models an electronic flash. A pair of separate front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

After a picture is taken with the one-time-use camera by manually depressing the shutter release button, the photographer manually rotates the thumbwheel in a film winding direction to similarly rotate the film winding spool inside the film cartridge. This winds an exposed frame of the filmstrip from the backframe opening into the film cartridge and advances an unexposed frame of the filmstrip from the unexposed film roll to the backframe opening. The rewinding movement of the filmstrip the equivalent of slightly more than one frame width rotates the metering sprocket in engagement with the filmstrip to decrement the exposure counter wheel to its next lower-numbered indicia and to pivot a metering lever into engagement with the thumbwheel in order to prevent further manual rotation of the thumbwheel in the film winding direction. Manually depressing the shutter release button to take another picture pivots the metering lever out of engagement with the thumbwheel to permit renewed rotation of the thumbwheel in the film winding direction. When the maximum number of exposures available on the filmstrip have been made and the filmstrip is completely wound into the film cartridge, the one-time-use camera is given to a photofinisher who breaks away a cover door portion of the rear cover part from the main body part and removes the film cartridge with the exposed filmstrip from the cartridge receiving chamber. Then, he removes the exposed filmstrip from the film cartridge to develop the latent images and make prints for the customer.

Typically, one-time-use cameras do not include a self-timer, i.e. a delayed action shutter release, which is manually actuated to automatically initiate picture-taking after a predetermined interval of time has elapsed following the actuation. The predetermined interval of time allows one to become a part of the scene to be photographed after he or she has manually actuated the self-timer.

Prior art U.S. Pat. No. 5,946,514 issued Aug. 31, 1999 discloses a one-time-use camera with a self-timer. The self-timer is built into the camera and includes a number of gears and an escapement, and therefore significantly increases the cost of the camera and is relatively complex.

SUMMARY OF THE INVENTION

According to one aspect of the invention, a camera comprising a shutter release button that is depressible to initiate picture-taking, and a self-timer for automatically initiating picture-taking after a predetermined interval of time has elapsed, is characterized in that:

the self-timer is flexible and resilient to be manually deformable from a normal state to a deformed state and to have the capability of automatically returning to the normal state from the deformed state after the predetermined interval of time has elapsed; and a support in the vicinity of the shutter release button is constructed to receive the self-timer in the deformed state in order to position the self-timer raised from the shutter release button, but to permit the self-timer to automatically return to the normal state after the predetermined interval of time has elapsed in order to depress the shutter release button to initiate picture taking, and to permit removal of the self-timer from the support in order to use the shutter release button without the self-timer or to reuse the self-timer.

According to another aspect of the invention, a method of using a delayed action shutter release with a shutter release button that is manually depressible to initiate picture-taking in order to automatically initiate picture-taking after a predetermined interval of time has elapsed, comprises:

deforming a resilient elastic piece, which serves as the delayed action shutter release, from a normal state to a deformed state to allow the resilient elastic piece to automatically return to the normal state from the deformed state after the predetermined interval of time has elapsed; and positioning the resilient elastic piece in the deformed state raised slightly from the shutter release button to allow the resilient elastic piece to automatically return to the normal state after the predetermined interval of time has elapsed in order to cause the elastic piece to depress the shutter release button to initiate picture taking.

BRIEF DESCRIPTION OF THE DRAWING

FIG. 3 is a bottom perspective view of the self-timer in a normal relaxed concave state;

FIG. 4 is a bottom perspective view of the self-timer in a deformed tensioned convex state;

FIG. 5 is a cross-section view of the self timer as shown in FIG. 3; and

FIG. 6 is a cross-section view of the self timer as shown in FIG. 4.

DETAILED DESCRIPTION OF THE INVENTION

The invention is disclosed as being embodied preferably in a disposable one-time-use camera. Because the features of a one-time-use camera unit are generally known, the description which follows is directed in particular only to those elements forming part of or cooperating directly with the disclosed embodiment. It is to be understood, however, that other elements may take various forms known to a person of ordinary skill in the art.

Figure 1:
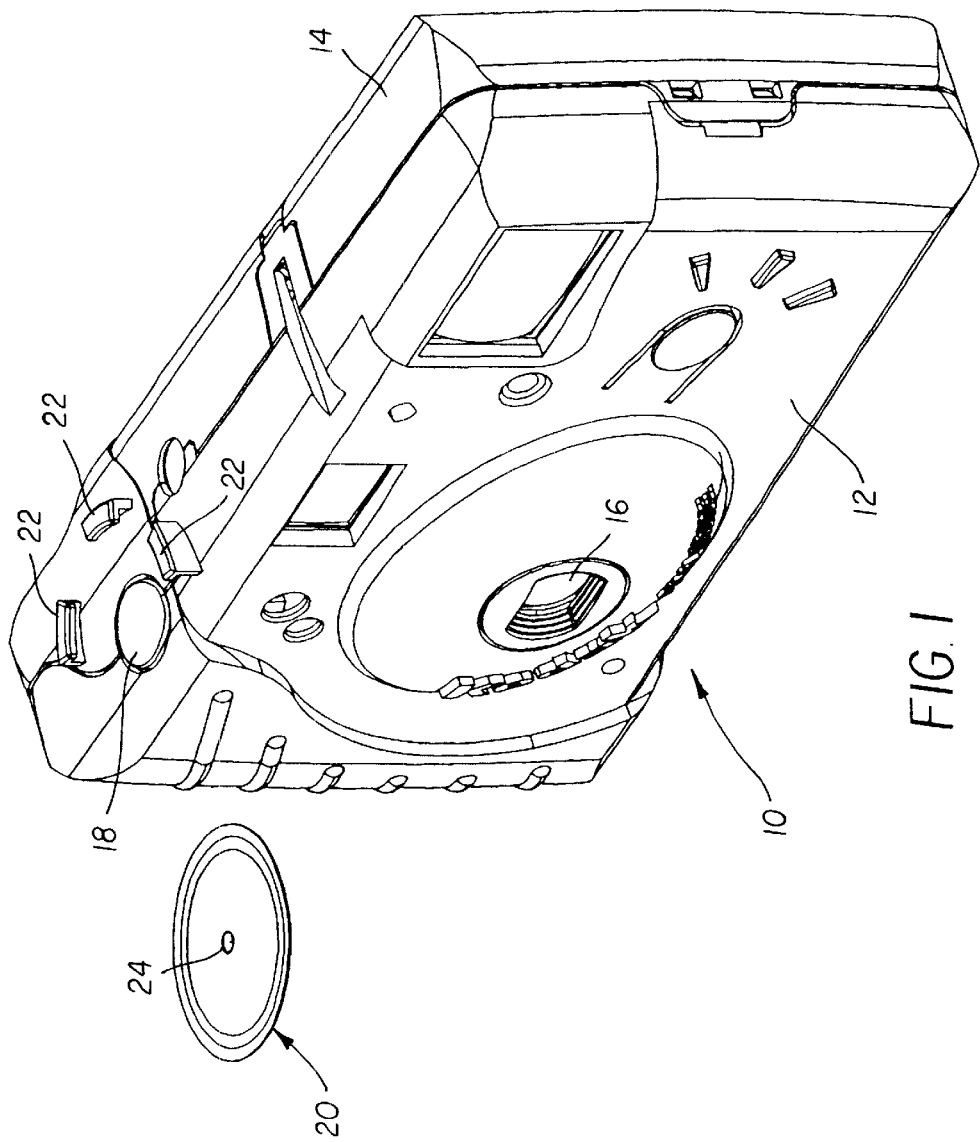
FIG. 1 is a front perspective view of a one-time-use camera with an auxiliary self-timer pursuant to a preferred embodiment of the invention, showing the self-timer before it is mounted on the camera over a shutter release button.
Figure 2:
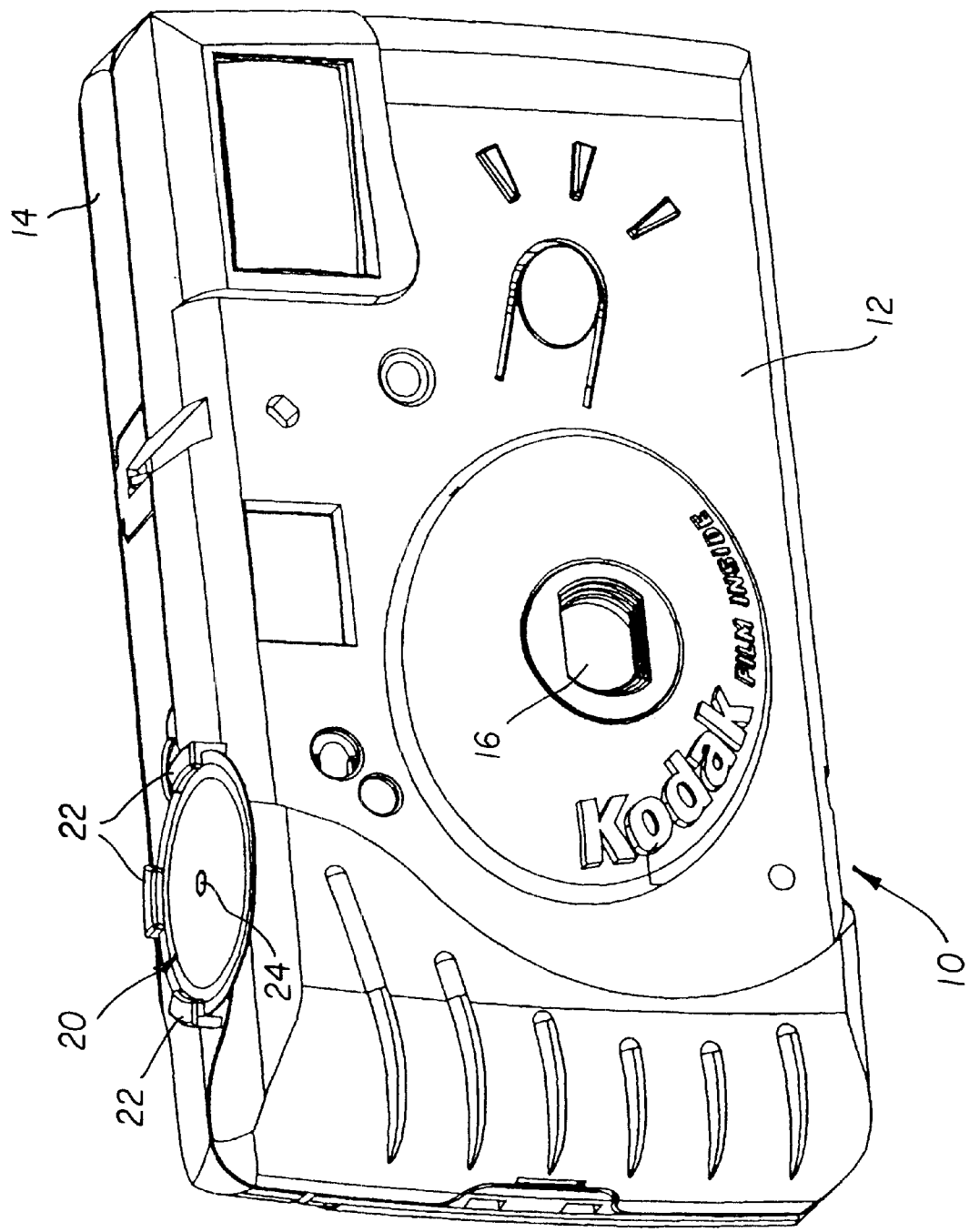
FIG. 2 is a front perspective view of the camera showing the self-timer mounted on the camera over the shutter release button.

Referring now to the drawings, FIGS. 1 and 2 depict a disposable one-time-use camera 10. The parts to be described that are not indicated by reference numbers are not shown in FIGS. 1 and 2. The camera 10 includes a plastic opaque interior main body part, a plastic opaque exterior front cover part 12, and a plastic opaque exterior rear cover part 14. The front cover part 12 and the rear cover part 14 house the main body part between them and are connected releasably to one another and to the main body part via known hook-in-hole connections.

As is typical, the main body part has a rearwardly open cartridge receiving chamber for a conventional film cartridge and a rearwardly open film supply chamber for an unexposed film roll on a rotatable film supply spool. During assembly of the camera 10, an unexposed filmstrip is substantially prewound from a rotatable film winding spool inside a shell of the film cartridge and into the unexposed film roll on the film supply spool. A rearwardly open backframe opening is located between the cartridge receiving chamber and the film supply chamber for exposing successive frames of the filmstrip when a shutter blade rearwardly uncovers a front taking lens 16 on the main body part. To take a picture, a manually depressible shutter release button 18 must be depressed. As disclosed in prior art U.S. Pat. No. 5,946,514, which is incorporated in this application, when the shutter release button 18 is depressed a cantilevered beam having the shutter release button integrally formed at a free end of the beam is bent, beginning at the free end, to release a high energy lever which then briefly strikes the shutter blade to pivot the shutter blade open to momentarily uncover the front taking lens 16.

A rotatable film winding thumbwheel coaxially engages the film winding spool inside the shell of the film cartridge and radially protrudes from an elongate narrow opening in the rear cover part 14 in order to be manually grasped or fingered at its periphery to incrementally rotate the thumbwheel in a film winding direction to similarly rotate the film winding spool. This is done in order to wind an exposed frame of the filmstrip from the backframe opening into the film cartridge after each film exposure, and to move a fresh frame of the filmstrip from the unexposed film roll to the backframe opening.

A self-timer that is otherwise referred to as a delayed action shutter release or delayed action device is an elastic diaphragm or thin metal disk 20. The diaphragm 20 as shown in FIGS. 3 and 5 is shaped like an erect shallow bowl or dish and is both flexible and resilient. The term "resilient" as is commonly used means the capability of a strained body to recover its shape after deformation. FIGS. 3 and 5 show the diaphragm 20 is a normal or relaxed concave state. However, as shown in FIGS. 4 and 6 the diaphragm 20 can be manually deformed to a tensioned (stressed) convex state in which the diaphragm appears to be an inverted shallow bowl or dish. In this instance, the diaphragm 20 will automatically snap back to its normal relaxed concave state shown in FIGS. 3 and 5 after a brief time delay, i.e. an interval of 20 seconds for example.

The front and rear cover parts 12 and 14 have a support for the diaphragm 20 preferably in the form of three evenly spaced mounting brackets 22 which only partially surround the shutter release button 18 as shown in FIG. 1. (Of course, any number of known mounting means can be substituted.) The three brackets 22 are constructed to receive the diaphragm 20 in the tensioned (stressed) convex state in which the diaphragm appears to be an inverted shallow bowl or dish, in order to position a centered projection 24 on the diaphragm slightly raised from and pointing to the shutter release button 18. See FIGS. 2, 4 and 6. After the brief interval of time, i.e. 20 seconds for example, has elapsed, the diaphragm 20 will automatically snap back to its normal relaxed concave state in which the diaphragm appears to be an erect shallow bowl or dish as shown in FIGS. 3 and 5. This causes the centered projection 24 to depress the shutter release button 18 to initiate picture-taking.

To use the diaphragm 20 as a self-timer, it is first manually deformed to the tensioned (stressed) convex state shown in FIGS. 4 and 6. Then, the diaphragm 20 is manually positioned on the three mounting brackets 22 as shown in FIG. 2. When the brief interval of time, i.e. 20 seconds for example, has elapsed, the diaphragm 20 automatically snaps back to its normal relaxed concave state shown in FIGS. 3 and 5. This causes the centered projection 24 to depress the shutter release button 18 to initiate picture-taking. As with any self-timer, the 20-second interval is sufficient to allow one to become a part of the scene to be photographed. Finally, the diaphragm 20 in the normal relaxed convex state is removed from the three mounting brackets 22 to permit the shutter release button 18 to be used without the diaphragm or to reuse the diaphragm. See FIG. 1.

The invention has been described in detail with particular reference to certain preferred embodiments thereof, but it will be understood that variations and modifications can be effected within the spirit and scope of the invention.

PARTS LIST 10. one-time-use camera
12. front cover part
14. rear cover part
16. front taking lens
18. shutter release button
20. diaphragm
22. mounting brackets
24. centered projection

What is claimed is:

1. A camera comprising a shutter release button that is depressible to initiate picture-taking, and a self-timer for automatically initiating picture-taking after a predetermined interval of time has elapsed, is characterized in that:

said self-timer is flexible and resilient to be manually deformable from a normal state to a deformed state and to have the capability of automatically returning to the normal state from the deformed state after the predetermined interval of time has elapsed; and a support in the vicinity of said shutter release button is constructed to receive said self-timer in the deformed state in order to position said self-timer raised from said shutter release button, but to permit said self-timer to automatically return to the normal state after the predetermined interval of time has elapsed in order to depress said shutter release button to initiate picture taking, and to permit removal of said self-timer from said support in order to use said shutter release button without said self-timer or to reuse said self-timer.

2. A camera as recited in claim 1, wherein said self-timer is a thin flexible disk having a centered projection that points to said shutter release button when said self-timer is received by said support in the deformed state and that depresses said shutter release button when said self-timer automatically returns to the normal state.

3. A camera as recited in claim 1, wherein said support only partially surrounds said shutter release button.

4. A camera as recited in claim 1, wherein said support includes a series of spaced mounting brackets for receiving said self-timer in the deformed state to position said self-timer raised from said shutter release button and to permit said self-timer to automatically return to the normal state after the predetermined interval of time has elapsed.

5. A camera comprising a shutter release button that is depressible to initiate picture-taking, and a self-timer for automatically initiating picture-taking after a predetermined interval of time has elapsed, is characterized in that:

said self-timer is an elastic diaphragm capable of being manually deformed from a relaxed concave state to a tensioned convex state and which is resilient to have the capability of automatically returning to the relaxed concave state from the tensioned convex state after the predetermined interval of time has elapsed; and a support in the vicinity of said shutter release button is constructed to receive said diaphragm in the tensioned convex state in order to position said diaphragm raised from said shutter release button, but to permit said diaphragm to automatically return to the relaxed concave state after the predetermined interval of time has elapsed in order to depress said shutter release button to initiate picture taking, and to permit removal of said diaphragm from said support in order to use said shutter release button without said diaphragm or to reuse said diaphragm.

6. A method of using a delayed action shutter release with a shutter release button that is manually depressible to initiate picture-taking in order to automatically initiate picture-taking after a predetermined interval of time has elapsed, comprising:

deforming a resilient elastic piece, which serves as the delayed action shutter release, from a normal state to a deformed state to allow the resilient elastic piece to automatically return to the normal state from the deformed state after the predetermined interval of time has elapsed; and positioning the resilient elastic piece in the deformed state raised slightly from the shutter release button to allow the resilient elastic piece to automatically return to the normal state after the predetermined interval of time has elapsed in order to cause the elastic piece to depress the shutter release button to initiate picture taking.

7. A method of using a self-timer with a shutter release button that is manually depressible to initiate picture-taking in order to automatically initiate picture-taking, comprising:

deforming an elastic diaphragm, which serves as the self-timer, from a relaxed concave state to a tensioned convex state to allow the diaphragm to automatically return to the relaxed concave state from the tensioned convex state; and positioning the diaphragm in the tensioned convex state raised slightly from the shutter release button to allow the diaphragm to automatically return to the relaxed concave state in order cause the diaphragm to depress the shutter release button to initiate picture taking.

8. A method as recited in claim 7, further comprising:

removing the diaphragm in the relaxed convex state from the shutter release button to permit the shutter release button to be used without the diaphragm or to reuse the diaphragm.

9. A camera comprising a shutter release button that is depressible to initiate picture-taking, and a self-timer for automatically initiating picture-taking after a predetermined interval of time has elapsed, is characterized in that:

said self-timer is a delayed action shutter release means to be manually deformed from a normal state to a deformed state and to automatically return to the normal state from the deformed state after the predetermined interval of time has elapsed; and a support in the vicinity of said shutter release button is constructed to receive said delayed action shutter release means in the deformed state in order to position said delayed action shutter release means to depress said shutter release button to initiate picture taking when said delayed action shutter release means automatically returns to the normal state after the predetermined interval of time has elapsed.

10. A camera as recited in claim 9, wherein said support permits removal of said delayed action shutter release means to permit said shutter release button to be used without said delayed action shutter release means or to reuse said delayed action shutter release means.

* * * * *